US010564479B2

(12) United States Patent
Nishiwaki et al.

(10) Patent No.: US 10,564,479 B2
(45) Date of Patent: Feb. 18, 2020

(54) DISPLAY DEVICE

(71) Applicant: SHARP KABUSHIKI KAISHA, Sakai, Osaka (JP)

(72) Inventors: Shogo Nishiwaki, Sakai (JP); Katsuhiko Morishita, Sakai (JP); Hisashi Nagata, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/438,900

(22) Filed: Jun. 12, 2019

(65) Prior Publication Data

US 2019/0384121 A1 Dec. 19, 2019

Related U.S. Application Data

(60) Provisional application No. 62/684,595, filed on Jun. 13, 2018.

(51) Int. Cl.
*G02F 1/1337* (2006.01)
*G02F 1/1335* (2006.01)

(52) U.S. Cl.
CPC .. *G02F 1/133723* (2013.01); *G02F 1/133512* (2013.01); *G02F 1/133514* (2013.01); *G02F 1/133528* (2013.01); *G02F 2201/501* (2013.01); *G02F 2202/02* (2013.01)

(58) Field of Classification Search
CPC ................................................ G02F 1/133723
See application file for complete search history.

(56) References Cited

U.S. PATENT DOCUMENTS

| 2010/0182896 A1* | 7/2010 | Uchiyama | .......... G11B 7/24038 369/284 |
| 2014/0063407 A1* | 3/2014 | Kwon | ................... G02F 1/1339 349/58 |
| 2015/0103294 A1* | 4/2015 | Miyake | .................. G02B 5/208 349/96 |
| 2017/0160766 A1* | 6/2017 | Gupta | .................... G06F 1/1605 |
| 2018/0355088 A1* | 12/2018 | Ogawa | .................... C08L 33/04 |
| 2019/0044069 A1* | 2/2019 | Nishida | ................. C23C 14/042 |

FOREIGN PATENT DOCUMENTS

JP H11-42786 A 2/1999

\* cited by examiner

*Primary Examiner* — Sang V Nguyen
(74) *Attorney, Agent, or Firm* — ScienBiziP, P.C.

(57) ABSTRACT

A display device includes a display panel and imaging means. The display panel includes a first substrate, a second substrate, and an electrooptical substance layer between the first and second substrates. The display panel has a first substrate side as an external light entering side and is partitioned into a display area and a non-display area. The non-display area includes a light-transmitting area through which the external light entering the display panel is transmitted toward a second substrate side of the display panel. The imaging means is disposed on the second substrate side so as to receive the external light transmitting through the light-transmitting area, and a short-wavelength-light absorption layer capable of absorbing light having a wavelength shorter than visible light is disposed on the external light entering side with respect to the electrooptical substance layer and the short-wavelength-light absorption layer extends over an entire area of the light-transmitting area.

7 Claims, 7 Drawing Sheets

DISPLAY DEVICE

CROSS REFERENCE TO RELATED APPLICATION

This application claims priority from U.S. Provisional Application No. 62/684,595 filed on Jun. 13, 2018. The entire contents of the priority application are incorporated herein by reference.

TECHNICAL FIELD

The present technology relates to a display device.

BACKGROUND ART

A display device including a display panel that displays an image and imaging means such as a camera has been known. For example, Patent Literature 1 described below suggests a liquid-crystal display device in which an image-receiving part of the imaging means is provided inward in an image display area of a liquid-crystal panel, which is one example of a display panel. Normally, a polarizing plate is affixed to the surface of the liquid-crystal panel, and a colored layer (color filter) which produces a predetermined color reaction, lines for controlling transmission light by changing the orientation of the liquid crystal, and so forth are provided in the image display area. In the liquid-crystal display device provided with imaging means in the image display area, in order to prevent an obstacle to imaging, a light-transmitting area where not only a light-shielding film but also a polarizing plate, a colored layer, lines, and so forth are not disposed is formed in the image display area, and the imaging means is arranged at a position superposed on the light-transmitting area on a back surface side (opposite to an image display surface where an image is displayed) of the liquid-crystal panel.

RELATED ART DOCUMENT

[Patent Literature 1] Japanese Unexamined Patent Application Publication No. 1-142786

External light such as sunlight including short-wavelength light with large energy such as ultraviolet light. In the liquid-crystal display device provided with a light-transmitting area where the imaging means is arranged, external light can directly reach the inside of the liquid-crystal panel, thereby, for example, altering the liquid-crystal material due to short-wavelength light with large energy to possibly influence the image display function. In particular, in the display panel configured to have a light-transmitting area provided inward in the display area as in Patent Literature 1 described above, when the liquid-crystal material is altered due to ultraviolet light in external light and so forth, the quality of the displayed image is easily degraded in the display area on the periphery of the light-transmitting area. For example, in a liquid-crystal panel having an electrooptical substance as a liquid-crystal material, if the liquid-crystal material is degraded due to ultraviolet light and so forth, a voltage retention ratio in the display area on the periphery of the light-transmitting area is decreased, and a so-called stain may occur.

SUMMARY

The present technique has been completed based on the above-described circumstances, and has an object of reducing a decrease in display quality in a display panel including a display panel with a light-transmitting area formed thereon and imaging means which performs imaging by receiving light transmitting through the light-transmitting area of the display panel.

One embodiment of the technology disclosed by the specification is directed to a display device including a display panel capable of displaying an image; and imaging means that receives light from a target to be imaged as an image. The display panel includes a first substrate, a second substrate arranged to be opposed to the first substrate, and an electrooptical substance layer containing an electrooptical substance and sealed between the first substrate and the second substrate. The display panel has a first substrate side as an external light entering side through which external light enters, the display panel is partitioned into a display area where an image is displayed and a non-display area where no image is displayed, and the non-display area includes a light-transmitting area through which the external light entering the display panel is transmitted toward a second substrate side of the display panel. The imaging means is disposed on the second substrate side of the display panel at a position such that the imaging means receives the external light transmitting through the light-transmitting area, and a short-wavelength-light absorption layer capable of absorbing light having a wavelength shorter than visible light is disposed on the external light entering side with respect to the electrooptical substance layer of the display panel and the short-wavelength-light absorption layer extends over an entire area of the light-transmitting area.

According to the above-described structure, with the short-wavelength-light absorbing layer disposed over the entire area of the light-transmitting area on the external light entering side with respect to the electrooptical substance layer, light having a short wavelength with large energy reaching the electrooptical substance layer is decreased, and a decrease in display quality due to alteration of the electrooptical substance is reduced.

Note in the above-described structure that the electrooptical substance is a substance with optical characteristics such as transmittance and luminance changing with the supply of an electrical signal (current signal or voltage signal) and includes, for example, a liquid crystal, organic EL, and so forth.

According to the present technique, as for a display device including imaging means, the imaging means can be disposed near the display area and in turn in the display area while display quality is kept. Thus, design flexibility can be increased, and a highly-reliable display device with a narrowed non-display area, for example, a narrowed picture frame can be acquired.

DETAILED DESCRIPTION

First Embodiment

A first embodiment will be described with reference to FIG. 1 to FIG. 4.

Figure 2:
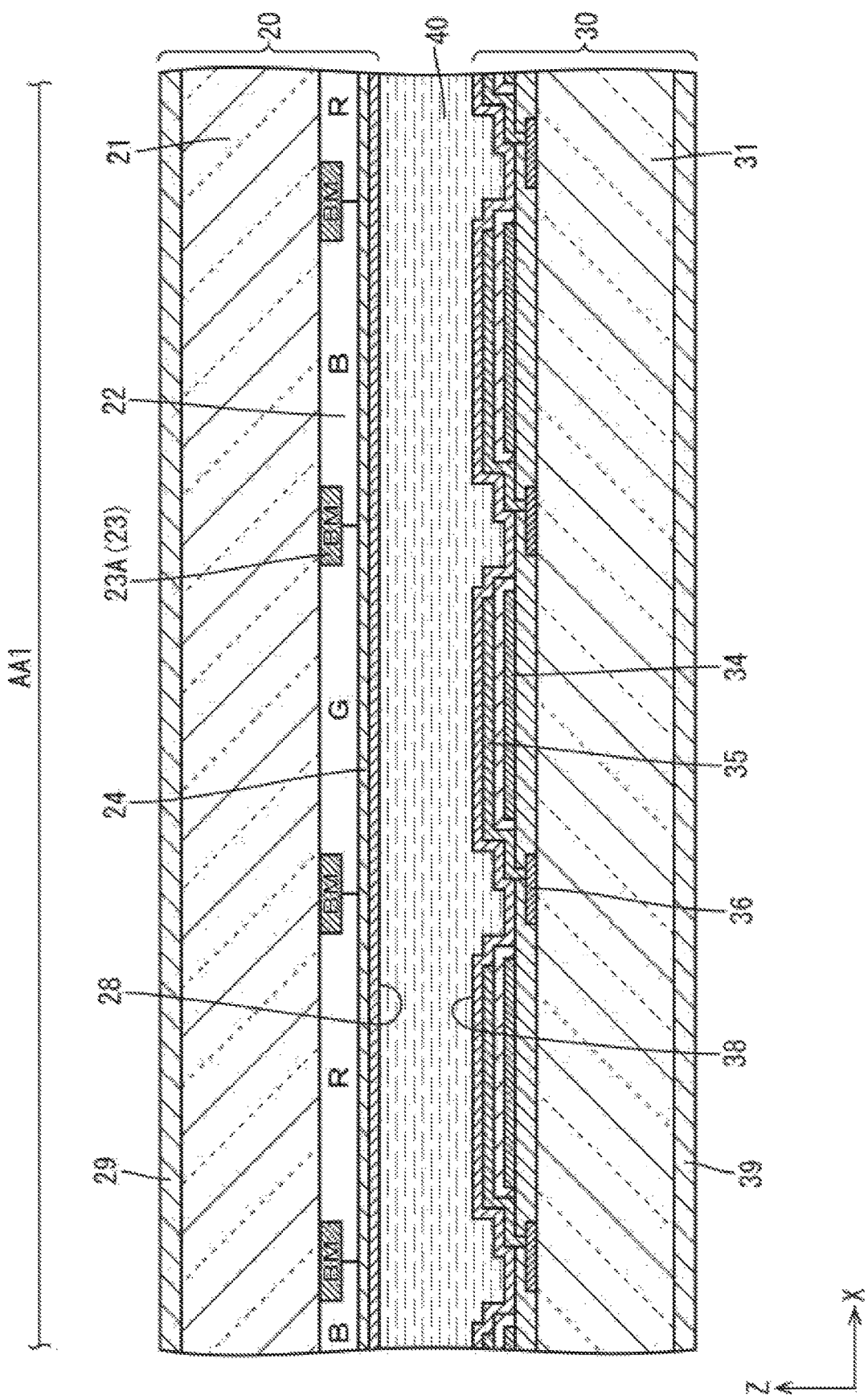
FIG. 2 is a schematic view depicting a general outline of a sectional structure in a display area of a liquid-crystal panel.
Figure 3:
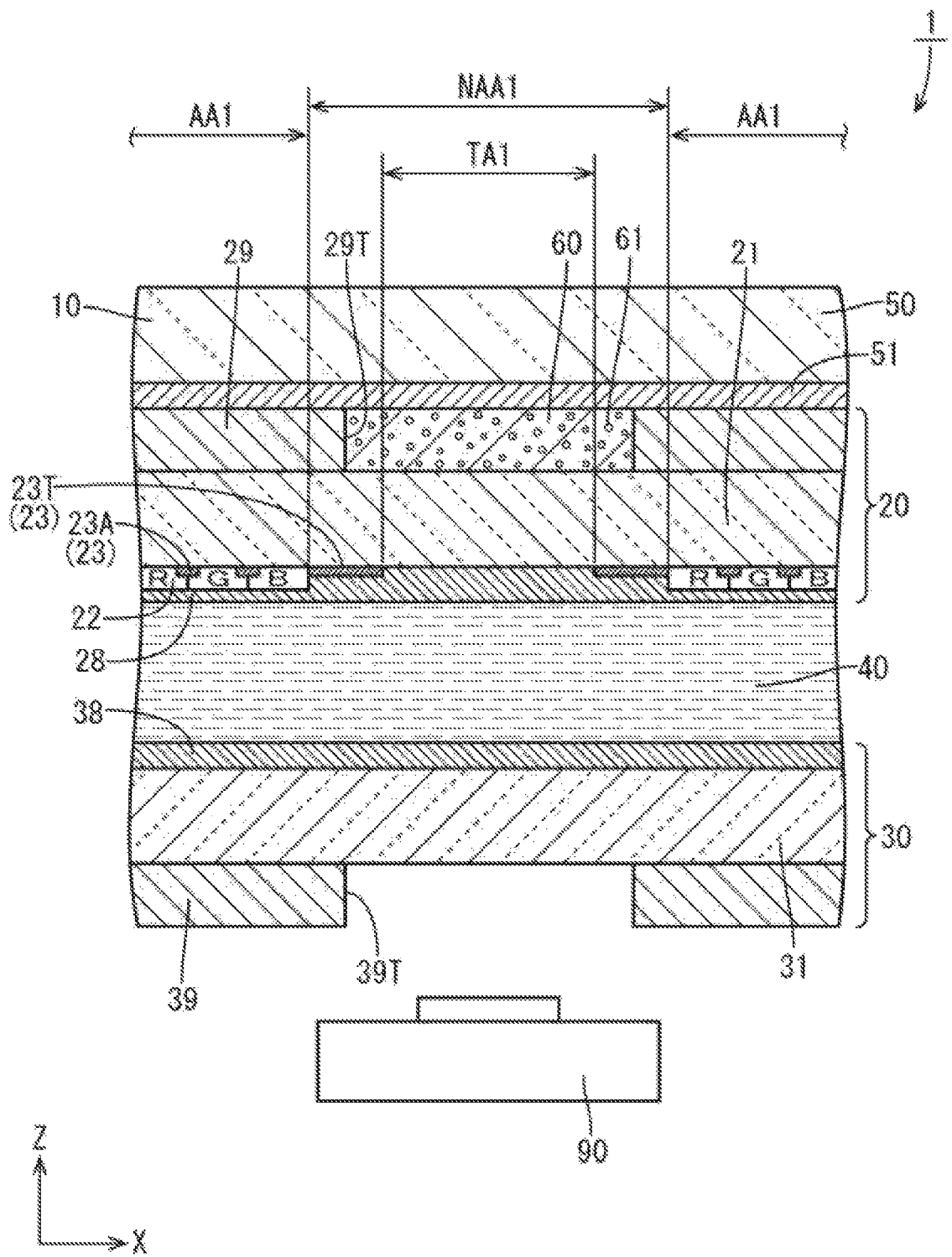
FIG. 3 is a partially-enlarged view depicting a general outline of a sectional structure in an A-A section of FIG. 1.

In the first embodiment, a liquid-crystal display device (one example of a display device) 1 including a liquid-crystal panel (one example of a display device) 10 and a camera (one example of imaging means) is exemplarily described. Note that an X axis, a Y axis, and a Z axis are depicted in a part of each drawing and rendered so that each axial direction indicates the same direction in each drawing. As for a plurality of identical members, one member may be provided with a reference sign and reference signs of the other members may be omitted. Also, in the following description, an upper side in FIG. 2 and FIG. 3 is a front side (a lower side is a back side).

The liquid-crystal display device 1 according to the first embodiment can be applied to, for example, portable telephone terminals (including a smartphone and others), notebook personal computers (including a tablet-type notebook personal computer and others), wearable terminals (including a smartwatch and others), portable information terminals (including an electronic book, PDA, and others), various electronic devices such as a portable game machine, and so forth. The liquid-crystal panel 10 can have a size generally classified as a small size or small-to-medium size with a screen size on the order of several inches to a little over ten inches. The present technique can be suitably applied particularly to a relatively small-sized display device, such as a smartphone, which includes imaging device and in which a narrowed picture frame is avidly sought, but is not limited to this. The present technique can be applied also to a display device having a screen size classified as a medium size or large size (super large size) equal to or larger than several tens of inches.

Figure 1:
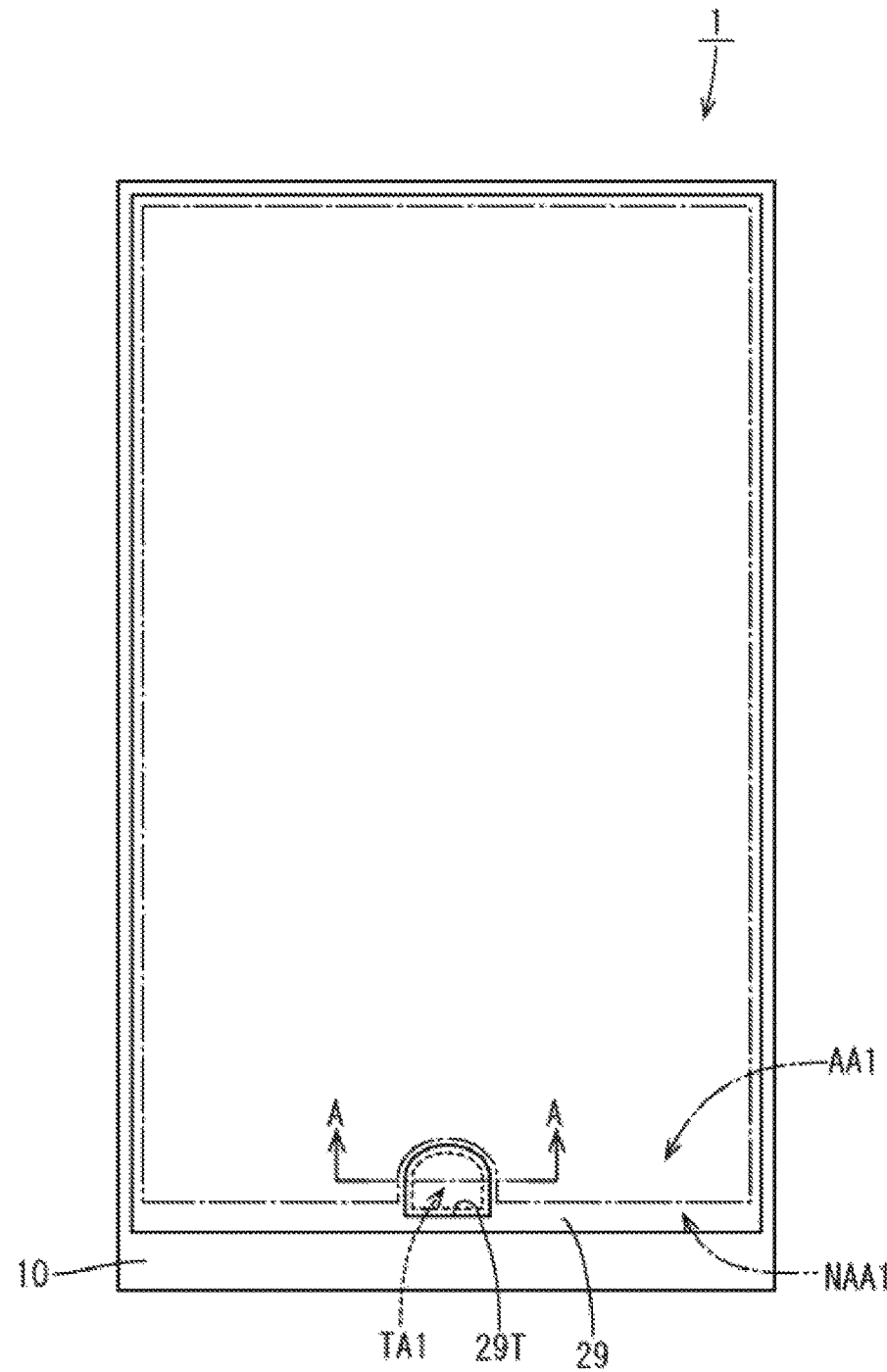
FIG. 1 is a schematic view depicting a general outline of a planar structure of a smartphone to which a liquid-crystal display device according to a first embodiment is applied.

FIG. 1 is a schematic view depicting a general outline of a planar structure of a smartphone to which the liquid-crystal display device 1 is applied. Note in FIG. 1 that, for convenience of description, representation is made with an omission of a cover glass 52 affixed to the forefront side of the liquid-crystal panel 10 via an adhesion layer 51 (refer to FIG. 3 for any of the components) (the same goes for FIG. 2 and FIG. 4).

As depicted in FIG. 1, the liquid-crystal display device 1 forms a longitudinally-elongated quadrangular shape (rectangular shape) as a whole, and includes the liquid-crystal panel 10 capable of displaying an image. The liquid-crystal panel 10 is disposed so that the short-side direction matches the X-axis direction in each drawing, the long-side direction matches the Y-axis direction in each drawing and, furthermore, the plate thickness direction matches the Z-axis direction (refer to FIG. 2). And, the plate surface of the liquid-crystal panel 10 on the front side is taken as an image display surface where images are displayed. The liquid-crystal panel 10 is partitioned into a display area (active area) AA1 disposed on a center side of that plate surface to form a substantially rectangular shape and capable of displaying images and a non-display area (non-active area) NAA1 disposed on an outer peripheral side surrounding the display area AA1 to form a substantially picture frame shape (frame shape). In FIG. 1, an area surrounded by a one-dot-chain line is taken as the display area AA1, and an area outside this is taken as the non-display area NAA1. In the liquid-crystal panel 10 according to the first embodiment, in detail, a center part of one short frame of the non-display area NAA1 surrounding the display area AA1 is formed so as to protrude in a substantially semicircular shape inside the display area AA1, and the inside of this protruding part is taken as a light-transmitting area TA1. In FIG. 1, an area surrounded by a dotted line is the light-transmitting area TA1. Also, a polarizing plate 29 is affixed on the front side of the liquid-crystal panel 10. At a portion of this polarizing plate 29 superposed on the light-transmitting area TA1, an opening hole part 29T next larger than the light-transmitting area TA1 is formed.

Note that, although not depicted in FIG. 1, a camera 90 (refer to FIG. 3) and a backlight device, which is an external light source for applying light for display on the liquid-crystal panel 10, are disposed on a back surface side of the liquid-crystal panel 10 and a driving component for driving the liquid-crystal panel 10, an external signal supply source for externally supplying various electrical signal to the driving component, and an external connection component for electrically connecting the liquid-crystal panel 10 and the external signal supply source are connected to the non-display area NAA1 of the liquid-crystal panel 10.

The structure of the liquid-crystal panel 10 will be described with reference to FIG. 2 to FIG. 3. Note in FIG. 2 and FIG. 3 that various structures are simplified and depiction is partially omitted.

As depicted in FIG. 2 and others, the liquid-crystal panel 10 is formed with paired substrates 20 and 39 affixed together, with one disposed on the front surface side being taken as a CF substrate (opposing substrate. One example of a first substrate) 20 and one disposed on the back surface side being taken as an array substrate (active matrix substrate. One example of a second substrate) 30. Between the CF substrate 20 and the array substrate 30, a predetermined cell gap is preserved, and a liquid-crystal layer (one example of an electrooptical substance layer) 40 containing a liquid-crystal material (one example of an electrooptical substance), which is a substance having optical characteristics changing with the application of an electric field, is sealed by a sealing material.

As depicted in FIG. 2 and others, the paired substrates 20 and 30 have transparent substrates 21 and 31, respectively, having heat resistance, insulation properties, and high light-transmitting characteristics. The transparent substrates 21 and 31 are formed of a glass plate, resin plate, or the like, and are substantially colorless and transparent. On an inner surface of each of both of the transparent substrates 21 and 31 (surface on a liquid-crystal layer 40 side, opposing surface), various films, which will be described further below, are laminated and formed in a predetermined pattern. On outer surfaces of these (surfaces opposite to the opposing surfaces), polarizing plates 29 and 39 are respectively affixed.

The polarizing plates 29 and 39 affixed to the outer surfaces of both of the transparent substrates 21 and 31 is disposed so as to cover at least the entire area of the display area AA1 across the non-display area NAA1, and have opening hole parts 29T and 39T (refer to FIG. 1, FIG. 3, and so forth), respectively, each forming an outer shape following the light-transmitting area TA1, at a portion superposed on the light-transmitting area TA1, so as not to interfere with travel of external light in that area entering the inside of the liquid-crystal panel 10 from a CF substrate 20 side and transmitting to an array substrate 30 side.

On sides closest to the liquid-crystal layer 40 on the inner surfaces of both of the transparent substrates 21 and 31, light alignment films (one example of a photoisomerization alignment layer) 28 and 38 for orienting the liquid-crystal material configuring the liquid-crystal layer 40 are respectively formed. The light alignment films 28 and 38 are both made of, for example, polyimide, and each is a photoisomerization alignment layer in which, for example, with application of light in a specific short-wavelength area, a photoisomerization reaction proceeds along its light applying direction to allow the liquid-crystal material in contact therewith to be oriented. In the first embodiment, the light alignment films 28 and 38 for orienting the liquid-crystal material by application of ultraviolet light are used. As required, the light alignment films 28 and 38 can be used as being subjected to an orientation process such as rubbing as appropriate. The liquid-crystal panel 10 according to the first embodiment operates in so-called FFS (Fringe Field Switching) mode, as will be described further below. For the light alignment films 28 and 38, horizontal alignment films for orienting the major axis of the liquid-crystal molecules in parallel with the substrate are used. The light alignment films 28 and 38 are formed solidly across at least the entire area of the display area AA1 of the respective substrates 20 and 30 and, furthermore in the first embodiment, are formed also in at least the light-transmitting area TA1 of the non-display area NAA1.

Various laminated films to be laminated and formed on the inner surface of the transparent substrate 31 in the display area AA1 are briefly described.

On the inner surface of the transparent substrate 31, for example, in the order from a lower layer side (transparent substrate 31 side, a side away from the liquid-crystal layer 40), a first metal film (first conductive film, metal film), a gate insulating film (first insulating film), a semiconductor film, a second metal film (second conductive film, metal film), a first interlayer insulating film (second insulating film), a planarizing film (insulating film, first insulating film, lower-layer-side insulating film), a first transparent electrode film (third conductive film, transparent electrode film), a second interlayer insulating film (third insulating film), a second transparent electrode film (fourth conductive film, transparent electrode film), and the alignment film 38 are laminated and formed.

The above-described first metal film and second metal film can be formed of a single-layer film made of a metal material of one type or a laminated film or alloy made of metal materials of different types selected from among, for example, copper, titanium, aluminum, molybdenum, tungsten, and so forth. The first metal film configures a gate line, which will be described further below, a gate electrode part of the TFT 36, and so forth. Also, the second metal film is disposed on an upper layer side of the first metal film via a gate insulating film, and configures a source line, which will be described further below, a source electrode part and a drain electrode part of the TFT 36, and so forth. The gate insulating film, the first interlayer insulating film, and the second interlayer insulating film are made of, for example, silicon nitride ($SiN_x$) or silicon oxide ($SiO_2$). The gate insulating film is laminated at least on an upper layer side of the first metal film. The first interlayer insulating film is disposed between the second metal film and the first transparent electrode film to keep both in an insulated state. The second interlayer insulating film is laminated on an upper layer side of the first transparent electrode film. Note that the first interlayer insulating film, the second interlayer insulating film, and the planarizing film, which will be described further below, have an opening at a pixel contact hole formed at a predetermined position for connecting the pixel electrode 35 formed of the second transparent electrode film, which will be described further below, to the drain electrode part made of the second metal film, and are formed solidly at least over the entire area of the display area AA1 except this pixel contact hole. The semiconductor film is formed of an oxide thin film containing indium (In), gallium (Ga), and zinc (Zn), each of which is one type of oxide semiconductors, which will be described further below, and is laminated on an upper layer side of the gate insulating film. The semiconductor film configures a channel part of the TFT 36, which will be described further below. The planarizing film is made of, for example, acrylic-based resin (for example, polymethyl methacrylate resin (PMMA)) as an organic material, and has a function of planarizing asperities due to the film structure formed on a lower layer side of this. The first transparent electrode film and the second transparent electrode film are made of a transparent electrode material such as, for example, ITO (Indium Tin Oxide) or ZnO (Zinc Oxide). The first transparent electrode film configures a common electrode 34, which will be described further below. The second transparent electrode film configures a pixel electrode 35, which will be described further below. Note that the laminated film provided on the inner surface of the transparent substrate 31 is not limited to the above-described structure, and can be changed as appropriate in accordance with the characteristics desired by the liquid-crystal panel. For example, the structure may be such that the above-described planarizing film.

As depicted in FIG. 2, on an inner surface side (liquid-crystal layer 40 side) of the array substrate 30 in the display area AA1, many pixel electrodes 35 and TFTs (Thin Film Transistors) 36, which are switching elements, are provided by the above-described laminated films as being aligned in a matrix shape (row shape), and gate lines (scanning line) and source lines (data lines, signal lines) forming a lattice shape are disposed so as to surround the periphery of these pixel electrodes 35 and TFTs 36. These gate lines and source lines are respectively connected to gate electrodes and source electrodes provided to the TFTs 36, and the pixel electrodes 35 are connected to drain electrodes provided to the TFTs 36. The pixel electrodes 35 are each disposed in a square area surrounded by the gate lines and the source lines.

Also, on a layer side lower than each pixel electrode 35 of the array substrate 30 in the display area AA1, a common electrode 34 formed of a solid pattern is formed so as to be superposed on the pixel electrode 35.

The structure formed on an inner surface of the transparent substrate 21 in the display area AA1 is described next.

As depicted in FIG. 2, colored layers 22 with three colors assuming red (R), green (G), and blue (B) configuring a color filter are provided on the inner surface of the transparent substrate 21. For example, with many with different colors aligned along the X-axis direction and many assuming the same color aligned along the Y-axis direction. Of the colored layers 22, the colored layers 22 are arrayed in a matrix shape as a whole, and the arrangement is such that each layer is superposed on each of the already-described pixel electrode 35 on the array substrate 30 side in a planar view. In the liquid-crystal panel 10 according to the first embodiment, one pixel part as a display unit is configured by a set of the R, G, and B colored layers 22 aligned along the X-axis direction and three pixel electrodes 35 opposed to each colored layer 22. And, between adjacent ones 22, an interpixel light-shielding part 23A in a substantially lattice shape formed of a light-shielding film (black matrix) for interrupting transmission of visible light is formed. The interpixel light-shielding part 23A functions to prevent crossings of light between adjacent pixel parts to ensure independence of grayscale. In particular, a portion extending along the Y-axis direction prevents color mixture between pixel parts assuming different colors. The light-shielding film 23 is provided in a range across the display area AA1 and the non-display area NAA1, forming the interpixel light-shielding part 23A in a lattice shape superposed on the gate lines and the source lines in the display area AA1 and, on the other hand, is disposed generally solidly in the non-display area NAA1, forming a peripheral light-shielding part 23B or the like (refer to FIG. 4 and so forth), which will be described further below. For the light-shielding film 23, while a metal material may be used, but a resin material is preferably used in view of reducing multireflection of external light.

Also, on the surface of the colored layers 22 and the interpixel light-shielding parts 23A, an overcoat layer 24 is provided. Although not depicted in FIG. 2, a spacer for retaining a space between the paired substrates 20 and 30, that is, the thickness of the liquid-crystal layer 40 (cell gap), may be formed to be protruded at an appropriate position on the surface of the overcoat layer 24.

In the liquid-crystal panel 10 with the display area AA1 formed as described above, while a common potential (reference potential) is applied to the common electrodes 34, the TFTs 36 are driven based on various signals supplied to the gate lines and the source lines, thereby controlling potential supply to the pixel electrodes 35. When a potential difference occurs between the pixel electrode 35 and the common electrode 34 superposed each other, a fringe electric field (diagonal electric field) including components along the plate surface of the transparent substrate 31 as well as components in the direction of the normal to the plate surface is applied. That is, the operation mode in the liquid-crystal panel 10 according to the first embodiment is set as FFS mode. This changes the alignment state of the liquid-crystal material contained in the liquid-crystal layer 40, and accordingly changes the polarizing state of light transmitting through the liquid-crystal panel 10. For example, in the transmission-type liquid-crystal display device 1, omnidirectional light emitted from the backlight device disposed on the back surface side of the liquid-crystal panel 10 transmits through the polarizing plate 39 on the array substrate 30 side, thereby becoming light only in one direction to enter the inside of the liquid-crystal panel 10. Then, when the light passes through the liquid-crystal layer 40, the polarizing state changes with the alignment state of the liquid-crystal material, and only the light capable of transmitting through the polarizing plate 29 on the CF substrate 20 side is outputted from the liquid-crystal panel 10. In this manner, by controlling the electric field to be applied to the liquid-crystal layer 40, the alignment state of the liquid-crystal material can be appropriately switched. By controlling the amount of transmission light of the liquid-crystal panel 10 individually for each pixel part, a predetermined color image is displayed in the display area AA1.

Meanwhile, in the liquid-crystal panel 10 according to the first embodiment, as the description made about FIG. 1, a part of the non-display area NAA1 is provided so as to protrude inside of the display area AA1, and the light-transmitting area TA1 is formed at this protruding portion. And, as depicted in FIG. 3, the camera 90 as imaging means is arranged on the back surface side (array substrate 3 side) of this light-transmitting area TA1.

In the following, the structure of the liquid-crystal panel 10 on the periphery of the light-transmitting area TA1 will be described with reference to FIG. 3 and FIG. 4.

FIG. 3 is a partially-enlarged view schematically depicting a general outline of a sectional structure of the liquid-crystal panel 10 in an A-A section of FIG. 1, that is, on the periphery of the light-transmitting area TA1. FIG. 4 is a partially-enlarged view schematically depicting a general outline of a planar structure of the liquid-crystal panel 10 on the periphery of the light-transmitting area TA1. Note that the cover glass 50 affixed to the polarizing plate 29 of the CF substrate 20 via the adhesion layer 51 on the forefront side of the liquid-crystal panel 10 is also depicted in FIG. 3. For both of the cover glass 50 and the adhesion layer 51, a substantially colorless and transparent material having high light-transmitting characteristics is used. The cover glass 50 and the adhesion layer 51 are superposed on a substantially entire area of the outer surface (plate surface on the front side) of the CF substrate 20 including the front surface side of the light-transmitting area TA1.

As depicted in FIG. 3, in the polarizing plates 29 and 39 affixed to the outer surfaces of the transparent substrates 21 and 31, the opening hole parts 29T and 39T are formed at positions of being superposed on the light-transmitting area TA1 already described. The opening hole parts 29T and 39T according to the first embodiment each form a substantially semicircular shape following the light-transmitting area TA1 and are each formed so as to be next larger as including the entire area of the light-transmitting area TA1. With provision of the opening hole part 29T, omnidirectional light passing through the cover glass 50 and the adhesion layer 51 to reach the polarizing plate 29 directly passes the transparent substrates 21 without being polarized and enters the inside of the liquid-crystal panel 10. Then, with provision of the opening hole part 39T, the light passing through the transparent substrate 31 directly reaches the camera 90 without being polarized. Thus, imaging can be performed with ease, without significantly decreasing the amount of light reaching the camera 90.

Also, as described in FIG. 3, on sides of the CF substrate 20 and the array substrate 30 closest to the liquid-crystal layer 40, the already-described light alignment films 28 and 38 are formed. In the first embodiment, the light alignment films 28 and 38 excellent in light-transmitting characteristics are used. As depicted in the drawing, the light alignment films 28 and 38 are formed solidly so as to cover the entire area of the display area AA1 as well as the entire area of the light-transmitting area TA1. The structure in which the light alignment films 28 and 38 are disposed also in the light-transmitting area TA1 in this manner is preferable, because initial orientation of the liquid-crystal material in the area can be easily kept.

Figure 4:
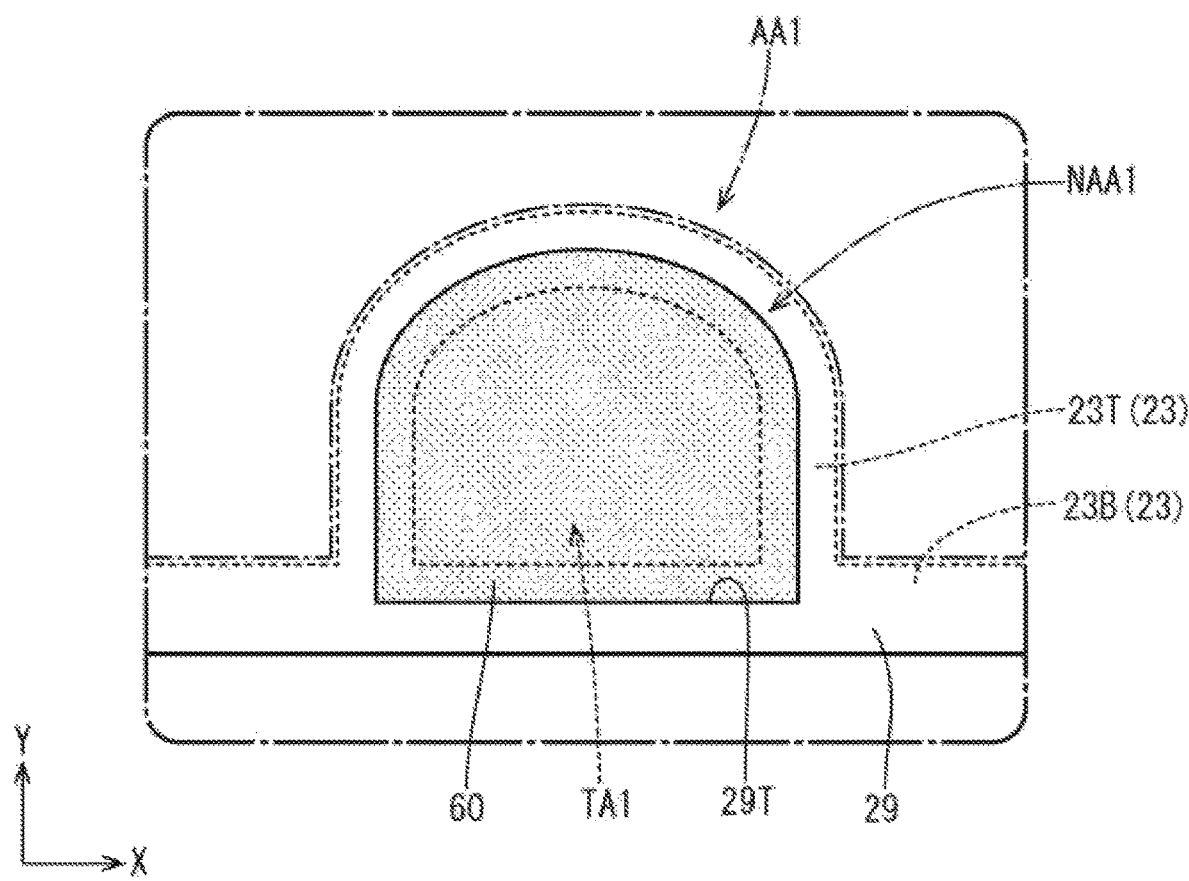
FIG. 4 is a partially-enlarged view depicting a general outline of a planar structure on the periphery of a light-transmitting area of FIG. 1.

As described in FIG. 4 and so forth, on the inner surface of the transparent substrate 21, a light-transmitting-edge light-shielding part 23T formed of the light-shielding film 23 is provided along the curved portion of the outer shape of the light-transmitting area TA1. The light-transmitting-edge light-shielding part 23T is to prevent a routing line provided on the array substrate 30 from being visually recognized from an image display surface side of the liquid-crystal panel 10. Note in FIG. 4 that the contour of the light-shielding film 23 formed on the back surface side of the polarizing plate 29 and the transparent substrate 21 is indicated by a dotted line. As depicted in the drawing, in the first embodiment, the light-transmitting-edge light-shielding part 23T is formed so as to form an arch shape, with its both base end parts connecting to the peripheral light-shielding part 23B surrounding the display area AA1 in a substantially rectangular picture frame shape. An area surrounded by an inner edge (inner edge of the arch) of this light-transmitting-edge light-shielding part 23T formed inward and next smaller than the opening hole part 29T of the polarizing plate 29 and the peripheral light-shielding part 23B is the light-transmitting area TA1. Also, an area surrounded by an outer edge (outer edge of the arch) of the light-transmitting-edge light-shielding part 23T and the peripheral light-shielding part 23B is the display area AA1. An area including the light-transmitting area TA1 positioned on the outer periphery of this display area AA1 is the non-display area NAA1. Note that while a boundary between the display area AA1 and the non-display area NAA1 overlaps a part of the boundary of disposition of the light-shielding film 23, the boundary of disposition of the light-shielding film 23 indicated by the dotted line and the boundary between the display area AA1 and the non-display area NAA1 indicated by a two-dot-chain line are slightly shifted for representation in FIG. 4 for convenience of description.

Normally, in view of prevention of light leakage, the peripheral light-shielding part 23B is disposed over a substantially entire area of the non-display area NAA. However, in the liquid-crystal panel 10 according to the first embodiment, the light-shielding film 23 is not formed in the light-transmitting area TA1 of the non-display area NAA1. This is because transmission of external light in the light-transmitting area TA1 is permitted to allow imaging by the camera 90. Also, since the light-transmitting area TA1 is the non-display area NAA1, no colored layer 22 is disposed. Thus, the thickness dimension of the CF substrate 20 in the non-display area NAA1 including the light-transmitting area TA1 is smaller than the thickness dimension in the display area AA1 having the colored layer 22 and so forth formed thereon. Thus, to reduce a level difference occurring at the boundary between both of the areas, the overcoat layer 24 made of organic insulating resin or the like may be provided (not depicted in FIG. 3) to ensure planarization of the light alignment film 28 formed on the side of the CF substrate 20 closest to the liquid-crystal layer 40.

Also, to preserve a cell gap between both of the substrates 20 and 30, a spacer may be provided also in the non-display area NAA so as to protrude from the inner surface of the CF substrate 20 toward the liquid-crystal layer 40. However, when the spacer is locally disposed on the periphery of the light-transmitting area TA1, unevenness occurs due to light interference to influence imaging. Thus, in the first embodiment, no spacer is disposed in the light-transmitting area TA1 and its peripheral area. Note that if a spacer is required to be disposed in the light-transmitting area TA1 in view of preservation of the cell gap and so forth, the spacer is preferably arranged on the entire surface of the light-transmitting area TA1 or at a position sufficiently spaced from the light-transmitting area TA1, in view of reducing the influence on imaging as much as possible.

On the inner surface inside the transparent substrate 31, in consideration of an influence on imaging, light-shielding structures such as lines formed of the already-described metal films or the like formed in the display area AA1 are not disposed in the light-transmitting area TA1. On the other hand, in view of planarization of the surface of the array substrate 30 on the liquid-crystal layer 40 side, it is preferable to use those excellent in light-transmitting characteristics for the already-described gate insulating film, interlayer insulating film, and the planarizing film (any of these are not depicted in FIG. 3) disposed in the display area AA1 and dispose these also in the light-transmitting area TA1 to form the light alignment film 38 on the surface of the foremost liquid-crystal layer 40 side.

Also, in the conventional liquid-crystal panel, in the non-display area NAA surrounding the display area AA, a sealing material is disposed between the CF substrate 20 and the array substrate 30 to affix both substrates 20 and 30 together to encapsulate the liquid-crystal layer 40. However, in the one configured as in the liquid-crystal panel 10 of the first embodiment in which the light-transmitting area TA1 is formed to protrude inward in the display area AA1, if a sealing material is disposed in the non-display area NAA1 between the light-transmitting area TA1 and the display area AA1, the entry of the liquid-crystal material into the light-transmitting area TA1 is restricted, and the inside of that area is not filled with the liquid-crystal material. Thus, in the liquid-crystal panel 10 according to the first embodiment, a sealing material is not disposed at a boundary between the light-transmitting area TA1 and the display area AA1, in other words, at a disposition position of the light-transmitting-edge light-shielding part 23T. Note that when a sealing material is required to be disposed also on the periphery of the light-transmitting area TA1 in view of preservation of a cell gap, a sealing material is preferably disposed by paying attention so that a filling route of the liquid-crystal material to the light-transmitting area TA1 is ensured.

In the liquid-display panel 10 according to the first embodiment, in the light-transmitting area TA1 formed as described above, an ultraviolet-light absorbing layer (one example of a short-wavelength-light absorbing layer) 60 having an ultraviolet-light absorbing function is disposed in the opening hole part 29T formed in the polarizing plate 29. The ultraviolet-light absorbing layer 60 can be formed of a known ultraviolet-light absorbing material. To reduce the influence on imaging by the camera 90, the ultraviolet-light absorbing layer 60 is preferably a substantially colorless and transparent resin layer excellent in light-transmitting characteristics and allowing unbiased transmission of at least light having a wavelength in a visible light area. The ultraviolet-light absorbing layer 60 can be prepared by, for example, adding and mixing an ultraviolet-light absorbent (short-wavelength-light absorbent) 61 into a base resin. As the base resin, any of various known transparent resins can be used. As a specific example, a transparent resin made of acrylic resin, polycarbonate resin, epoxy resin, or the like can be cited. Also, as the ultraviolet-light absorbent 61, any of various known ultraviolet-light absorbents can be used. For example, organic-based ultraviolet-light absorbents such as benzophenone-based, benzotriazole-based, and salicylic-acid-based absorbents and metal-based ultraviolet-light absorbents such as those of ultrafine particles of a metal oxide having a particle diameter on the order of 0.01 µm to 0.05 µm can be used. In particular, it is preferable to use an ultraviolent-light absorbent capable of effectively absorbing ultraviolet light having a wavelength orienting the liquid-crystal material when applied to the light alignment films 28 and 38. In the first embodiment, by way of example, the ultraviolet-light absorbing layer 60 made of colorless and transparent ultraviolet-light absorbing resin prepared by adding and mixing the organic-based ultraviolet-light absorbent 61 into epoxy resin is disposed.

In the first embodiment, after the polarizing plate 29 having the opening hole part 29T is affixed to the outer surface of the transparent substrate 21 with an adhesion layer or the like, the opening hole part 29T is filled with the above-described ultraviolet-light absorbing resin and cured to form the ultraviolet-light absorbing layer 60. Alternatively, after an ultraviolet-light shielding filter is cut out in accordance with the shape of the opening hole part 29T, this may be disposed in the opening hole part 29T. By providing the ultraviolet-light absorbing layer 60 in this method, the disposition position of the ultraviolet-light absorbing layer 60 is clear, and therefore the ultraviolet-light absorbing layer 60 can be disposed with ease at a desired position covering the light-transmitting area TA1 without burdensome positioning or the like.

The liquid-crystal panel 10 according to the first embodiment can be fabricated by, after disposing the ultraviolet-light absorbing layer 60 in the opening hole part 29T as described above, affixing the cover glass 50 via the adhesion layer 51 on an outside surface (surface on a front surface side, surface opposite to the transparent substrate 21) of the polarizing plate 29 and the ultraviolet-light absorbing layer 60 by using a double-sided tape or adhesive resin.

As described above, the liquid-crystal display device (display device) 1 according to the first embodiment includes the liquid-crystal panel (display panel) 10 capable of displaying an image, an d the camera (imaging means) 90 that receives light from a target to be imaged as an image. The display panel 10 includes the CF substrate (first substrate) 20, the array substrate (second substrate) 30 arranged to be opposed to the CF substrate 20, and the liquid-crystal layer (electrooptical substance layer) 40 containing the liquid-crystal material (electrooptical substance) and sealed between the CF substrate 20 and the array substrate 30. The display panel has the CF substrate 20 side as an external light entering side through which external light enters, the display panel is partitioned into the display area AA1 where an image can be displayed and the non-display area NNA1 where no image is displayed, the non-display area NAA1 includes the light-transmitting area TA1 through which the external light entering the display panel 10 is transmitted toward an array substrate 30 side of the liquid-crystal panel 10, and the camera 90 is disposed on the array substrate 30 side of the liquid-crystal panel 10 at a position such that the camera 90 receives the external light transmitting through the light-transmitting area TA1, and the ultraviolet-light absorbing layer (short-wavelength-light absorbing layer) 60 capable of absorbing ultraviolet light (light having a wavelength shorter than visible light) is disposed on the external light entering side with respect to the liquid-crystal layer 40 of the liquid-crystal panel 10 over an entire area of the light-transmitting area TA1.

Normally, in the first substrate disposed on the external light entering side, the polarizing plate is affixed so as to the entire area of the display area AA, and a colored layer for producing emission light emitted from a liquid-crystal panel side to display an image, an interpixel light-shielding part for reducing color mixture, and so forth are disposed. On the other hand, in the non-display area NAA of the first substrate, a peripheral light-shielding part for reducing light leakage outside the display area AA is disposed. Thus, it is rare for external light entering the liquid-crystal panel to reach the inner structure such as the liquid-crystal layer without passing through the polarizing plate or the colored layer. However, in a liquid-crystal panel provided with the light-transmitting area TA where imaging means such as a camera is arranged, external light such as sunlight can directly reach the inner structure of the liquid-crystal panel. In the liquid-crystal panel 10 having an electrooptical substance as a liquid-crystal material, if the liquid-crystal material is degraded due to ultraviolet light and so forth, a voltage retention ration in the display area AA on the periphery of the light-transmitting area TA is decreased, and a stain may occur.

According to the above-described structure of the first embodiment, with the ultraviolet-light absorbing layer 60 disposed on the external light entering side with respect to the liquid-crystal layer 40 over the entire area of the light-transmitting area TA1, even if sunlight is applied, ultraviolet light is absorbed in the ultraviolet-light absorbing layer 60, and ultraviolet light (short-wavelength light) with large energy reaching the liquid-crystal layer 40 is decreased and alteration of the liquid-crystal material is less prone to occur. Thus, the occurrence of a display failure such as a stain failure due to a decrease of the voltage retention ratio derived from degradation of the liquid-crystal material is reduced. As a result, according to the present technique, a highly-reliable display device including imaging means can be acquired.

Note that if a short-wavelength absorbing layer such as an ultraviolet-light absorbing layer is disposed in the display area AA1 of the display panel, the amount of light transmitting through the display panel is decreased due to light absorption and scattering in that layer. Also, by adding the layer, a new interface occurs, and refraction and reflection of light at this interface also decrease the amount of transmission light to degrade the optical performance of the display panel. By contrast, in the liquid-crystal display device 1 according to the first embodiment, the ultraviolet-light absorbing layer 60 is disposed only in the non-display area NAA1 of the liquid-crystal panel 10 and is not disposed in the display area AA1. Therefore, the optical performance of the liquid-crystal panel 10 is not degraded.

In the above-described liquid-crystal display device 1 according to the first embodiment, the light-transmitting area TA1 is provided so that at least a part thereof protrudes to the inside of the display area AA1.

In the display device configured so that the light-transmitting area TA protrudes to the inside of the display area AA, alteration of the electrooptical substance such as the liquid-crystal material in the light-transmitting area TA easily influences a displayed image in the display area AA on the periphery of the light-transmitting area TA.

According to the above-described structure of the first embodiment, alteration of the liquid-crystal material is less prone to occur, thereby allowing the light-transmitting area TA1 to be provided in the display area AA1 while preserving display quality and increasing arrangement flexibility of the camera 90 in the liquid-crystal display device 1. As a result, in the liquid-crystal display device 1 including the camera 90, the non-display area NAA1 can be narrowed, for example, a narrowed picture frame can be achieved.

In the above-described liquid-crystal display device 1 according to the first embodiment, as the electrooptical substance, a liquid-crystal material is used, the CF substrate 20 includes the light alignment film (alignment layer) 28 that is contacted with the liquid-crystal layer 40 to control the alignment of the liquid-crystal material, and the ultraviolet-light absorbing layer 60 is disposed on the external light incidence side with respect to the light alignment film 28.

In a liquid-crystal panel configured to control the orientation of the liquid-crystal material by an alignment layer, when external light directly reaches the alignment layer, the resin material forming the alignment layer is altered due to ultraviolet light and so forth, and the orientation of the liquid-crystal material in the electrooptical substance layer is disturbed to possibly degrade image display quality, such as causing a burn in the display area AA on the periphery of the light-transmitting area TA.

According to the above-described structure of the first embodiment, with the ultraviolet-light absorbing layer 60 disposed on the external light entering side with respect to the light alignment film 28 in the light-transmitting area TA1, the reach of short-wavelength light to the light alignment film 28 is reduced, and degradation in display quality due to orientation modulation is decreased.

In the above-described liquid-crystal display device 1 according to the first embodiment, the light alignment film (alignment layer) 28 is a light alignment film (photoisomerization alignment layer) 28 where photoisomerization is induced by ultraviolet light (light in a specific wavelength area), and a photoisomerization reaction wavelength area of the light alignment film 28 is included in an absorption area of the ultraviolent-light absorption layer 60.

For example, in a liquid-crystal panel having a photoisomerization alignment layer where photoisomerization occurs by light in a specific short-wavelength area, if a non-reacted component is left in the alignment layer after completion of the liquid-crystal panel and the light having the wavelength reaches the alignment layer during use, this light causes the non-reacted component to react, and a polymerization reaction proceeds to many directions, which are different from the alignment direction originally defined, to induce orientation modulation of the liquid-crystal material included in the liquid-crystal layer to possibly cause a so-called burn.

According to the above-described structure of the first embodiment, with disposition of the ultraviolet-light absorbing layer 60 absorbing light (ultraviolet rays) having the wavelength which induces a photoisomerization reaction of the light alignment film 28, even if sunlight is applied, a photoisomerization reaction of the light alignment film 28 can be prevented from proceeding in a direction other than the original alignment direction, thereby effectively reducing orientation modulation.

In the above-described liquid-crystal display device 1 according to the first embodiment, the CF substrate 20 includes the transparent transparent substrate 21, the transparent substrate 21 includes the colored layer 22 on the liquid-crystal layer 40 side thereof and visible light is transmitted through the colored layer and colored so that transmission light exhibits a predetermined color, and the ultraviolet-light absorbing layer 60 is disposed on the external light entering side with respect to the transparent substrate 21.

In the substrate configuring a display panel, various functional layers forming the inner structure of the display panel are provided on the electrooptical substance layer side with respect to the transparent substrate. If external light directly reaches the functional layers disposed in the display area in the first substrate disposed on the external light entering side, the quality of a displayed image may be degraded. For example, if external light reaches the colored layer, which is one example of the functional layers, the resin material and the colorant forming the colored layer are altered, and fading occurs in the display area AA on the periphery of the light-transmitting area TA.

According to the above-described structure of the first embodiment, with the ultraviolet-light absorbing layer 60 disposed on the external light entering side with respect to the transparent substrate 21, various functional layers formed in the transparent substrate can be protected. For example, the reach of ultraviolet light or the like to the colored layer 22 is reduced, and degradation in display quality due to fading is decreased. Also, according to the above-described structure of the first embodiment, various functional layers configuring the inner structure of the liquid-crystal panel 10 are formed on one plate surface side (liquid-crystal layer side) of the transparent substrate 21, and the ultraviolet-light absorbing layer 60 is formed on the other plate surface side (external light entering side). Thus, the ultraviolet-light absorbing layer 60 can be relatively easily formed.

In the above-described liquid-crystal display device 1 according to the first embodiment, in the CF substrate 20, the polarizing plate 29 is disposed on the external light entering side with respect to the transparent substrate 21, and the opening hole part 29T is formed in the light-transmitting area TA1 in the polarizing plate 29, and the ultraviolet-light absorbing layer 60 is disposed in the opening hole part 29T.

With the opening hole part formed in the polarizing plate, the refractive index and reflection of light change due to asperities to possibly affect the functions of the display device. For example, in the CF substrate 20 according to the first embodiment, a covering layer such as the cover glass 50 is disposed further outside the polarizing plate 29. When a gap (air layer) is formed by the opening hole part 29T on a layer side lower than the cover glass 50, reflection and refraction of light on a boundary surface may degrade display quality of an image displayed in the display area AA on the periphery of the light-transmitting area TA and may influence imaging by the camera 90. Also, if asperities are formed, air may be trapped or a foreign matter may get stuck between the cover glass 50 and the polarizing plate 29 to possibly cause a display failure or imaging failure.

According to the above-described structure of the first embodiment, with the ultraviolet-light absorbing layer 60 disposed in the opening hole part 29T formed in the polarizing plate 29, the surface of the CF substrate 20 in a state in which the polarizing plate 29 is disposed is planarized, and the gap formed between that and the cover glass 50 is filled with the ultraviolet-light absorbing layer 60, thereby reducing the influence of the asperities as described above. That is, inconveniences due to refraction and reflection of light is reduced, and the work of disposing the cover glass 50 by coating and affixing is facilitated.

Second Embodiment

Figure 5:
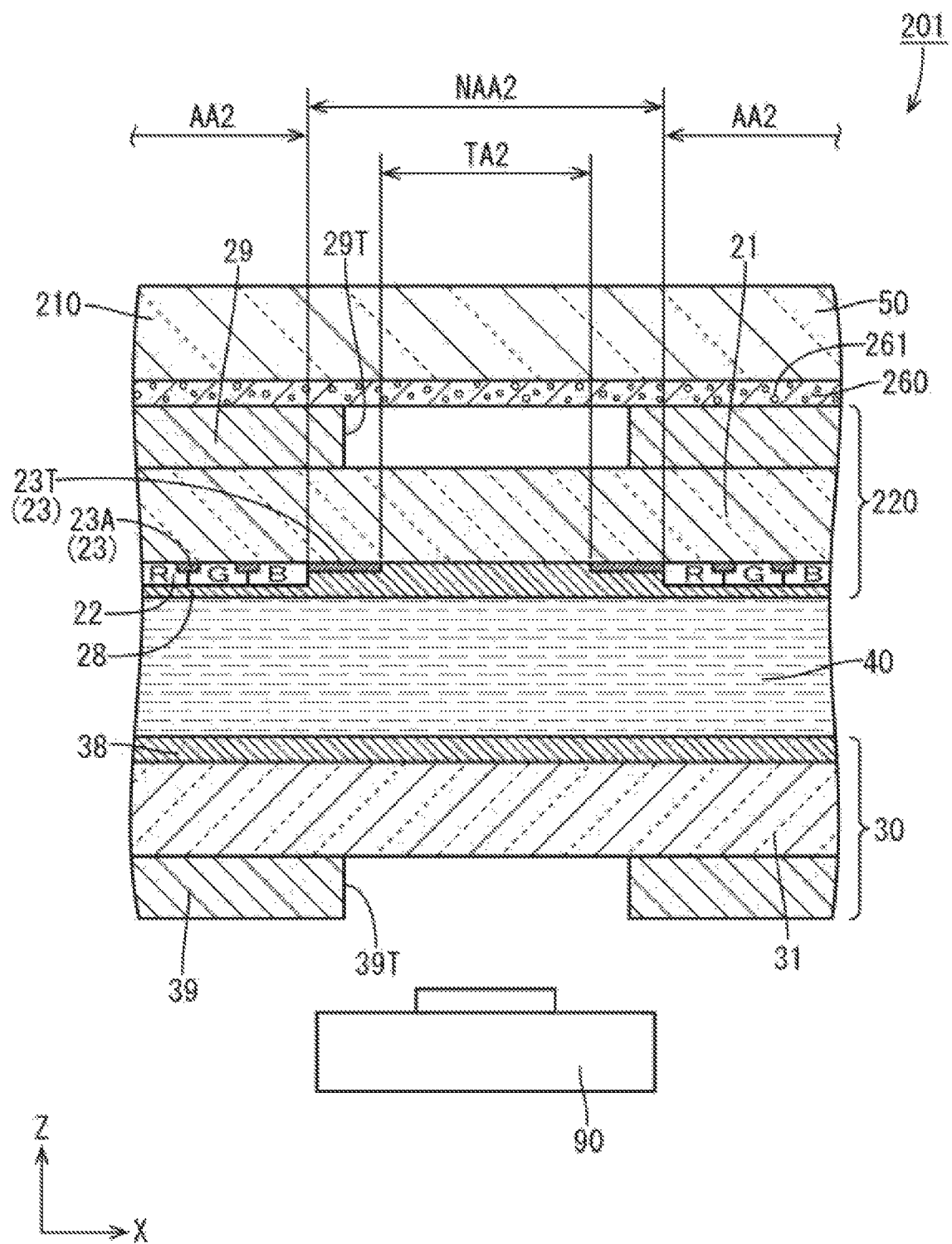
FIG. 5 is a schematic view depicting a general outline of a sectional structure of a display area of a liquid-crystal panel according to a second embodiment.

A second embodiment will be described with reference to FIG. 5.

A liquid-crystal display device 201 according to the second embodiment is different from the liquid-crystal display device 1 according to the first embodiment in that an ultraviolet-light absorbing layer is not the ultraviolet-light absorbing layer 60 with which the opening hole part 29T of the polarizing plate 29 is filled and coated as in the first embodiment but is formed of an adhesive layer 260 for affixing the cover glass 50 to the polarizing plate 29. In the following, a component similar to that of the first embodiment is provided with the same reference sign, and its description is omitted.

In the second embodiment, the adhesive layer 260 interposed between the polarizing plate 29 and the cover glass 50 disposed on its outer surface from a display area AA2 over a non-display area NAA2 including a light-transmitting area TA2 functions as a ultraviolet-light absorbing layer. The adhesive layer 260 according to the second embodiment is formed by mixing an ultraviolet-light absorbent 261 into an adhesive base resin. Any known material can be used for both of the adhesive base resin and the ultraviolet-light absorbent 261, but one that is excellent in adhesiveness, weather resistance, and so forth and has high light-transmitting characteristics and transparency is preferable. For example, they can be prepared by adding and mixing the ultraviolet-light absorbent 261 selected from the ultraviolet-light absorbents described for the ultraviolet-light absorbing layer 60 according to the first embodiment into an acrylic-based resin. In the second embodiment, the cover glass 50 is affixed to the outer surface of the polarizing plate 29 by using a double-sided tape having the adhesive layer 260 having an ultraviolet-light absorbing function. The cover glass 50 may be placed after a thermosetting resin including the ultraviolet-light absorbent 261 is applied to the outer surface of the polarizing plate 29, and may be cured by light or heat.

As described above, in the liquid-crystal panel 210 according to the second embodiment, in the CF substrate 220, the cover glass (externa layer) 50 is disposed via the adhesion layer 260 on the external light entering side with respect to the transparent substrate 21, and the ultraviolet-light absorbing layer is formed of the adhesion layer 260 containing the ultraviolet-light absorbent (short-wavelength-light absorbent) 261.

According to the structure of the above-described second embodiment, the ultraviolet-light absorbing layer formed of the adhesive layer 260 can be disposed without adding a new process to a conventional liquid-crystal panel manufacturing process. In the second embodiment, the adhesive layer 260 for affixing the cover glass 50 affixed to the surface further outside the polarizing plate 29 (surface opposite to the liquid-crystal layer 40) and interposed between the polarizing plate 29 and the cover glass 50 is taken as an ultraviolet-light absorbing layer. In this structure, for example, if the adhesive layer 260 is cured or the like in a state of being press-fitted into the opening hole part 29T formed in the polarizing plate 29, the ultraviolet-light absorbing layer formed of the adhesive layer 260 can be disposed in a state of filling the opening hole part 29T. Alternatively, the structure may be such that the polarizing plate 29 is taken as an outer layer, an adhesive layer is interposed between, for example, the transparent substrate 21 and the polarizing plate 29, and this adhesive layer is taken as an ultraviolet-light absorbing layer.

Other Embodiments

The present technology is not limited to the embodiments described based on the above description and the drawings and, for example, the following embodiments are also included in this technological scope.

Figure 6:
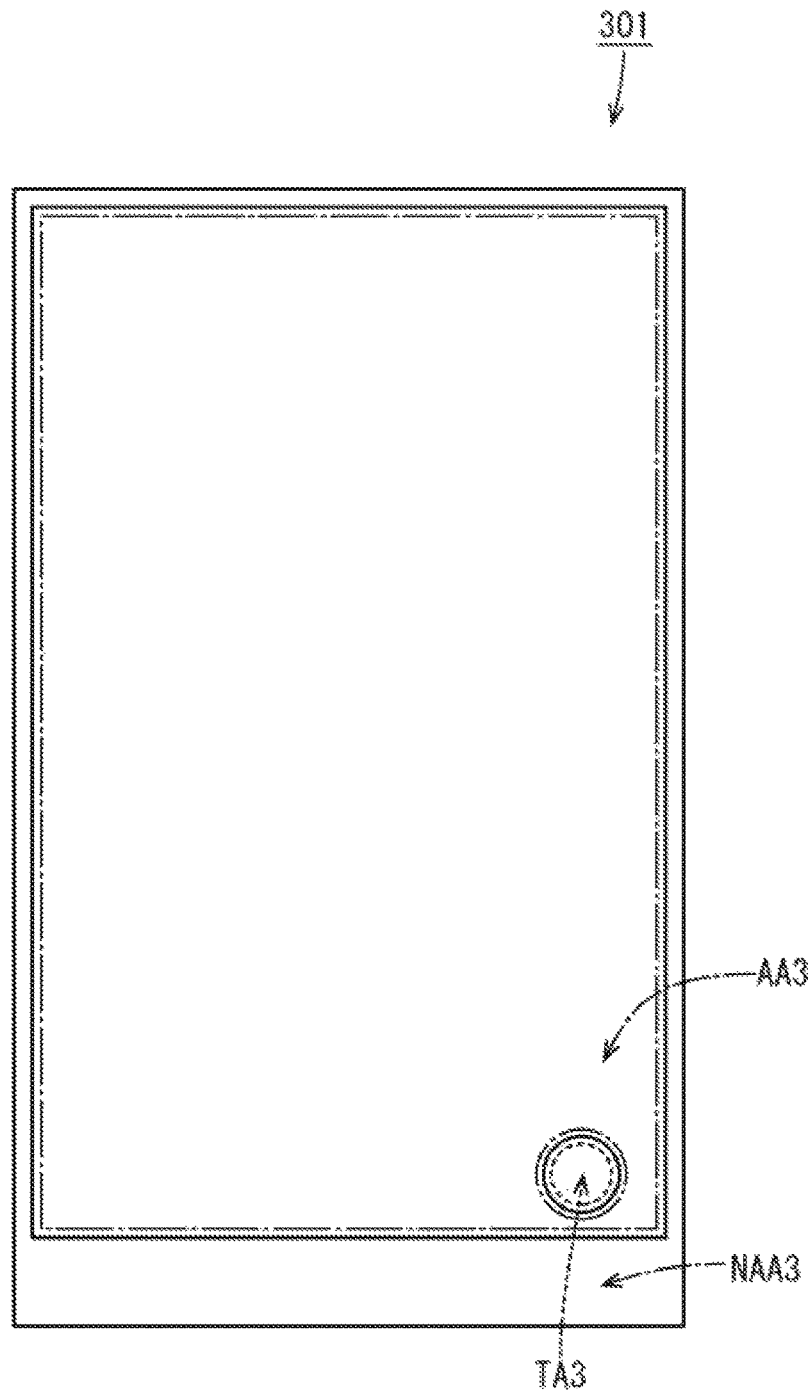
FIG. 6 is a schematic view depicting a general outline of a planar structure of a smartphone to which a liquid-crystal display device according to another embodiment is applied.
Figure 7:
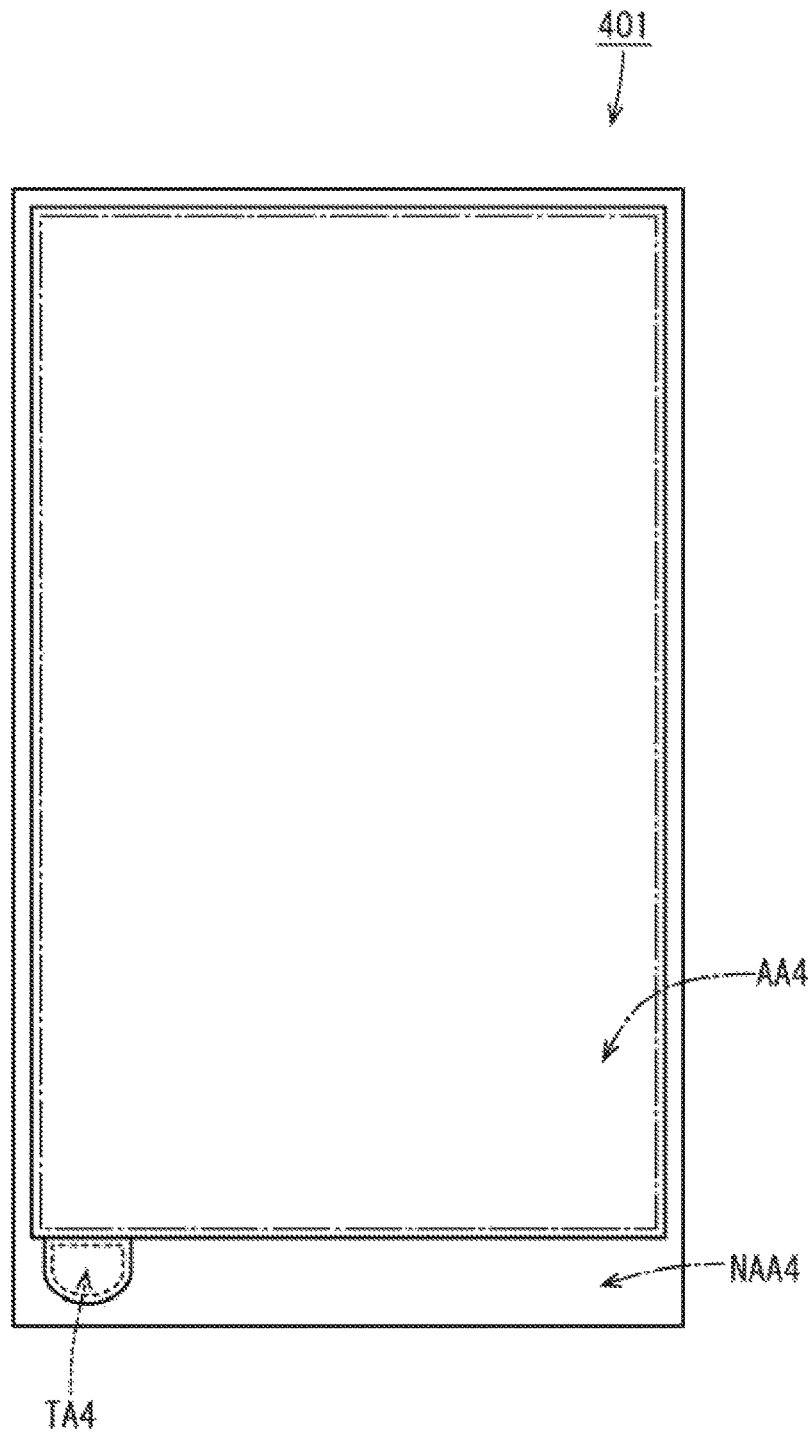
FIG. 7 is a schematic view depicting a general outline of a planar structure of a smartphone to which a liquid-crystal display device according to another embodiment is applied.

(1) In the above-described embodiments, the light-transmitting area TA formed so as to form a substantially semicircular shape has been exemplarily described. However, this is not meant to be restrictive. The light-transmitting area TA can be formed in any shape, such as a circle, square, polygon, indefinite shape, or the like. Also in the above-described embodiments, the light-transmitting area TA1 formed so as to protrude to the inside of the display area AA1 with the non-display area NAA1 forming a picture frame shape as a base end has been exemplarily described. However, this is not meant to be restrictive. For example, as a display device 301 depicted in FIG. 6, the structure may be such that a light-transmitting area TA3 is formed in a display area AA3 as being separated from another non-display area NAA3 and a light-transmitting-edge light-shielding part is isolated from the peripheral light-shielding part. In the display device 301 as configured above, since the display area AA3 surrounds the entire periphery of the light-transmitting area TA3, the device is susceptible to the influence of light entering form the light-transmitting area TA3 to the inside of the liquid-crystal panel, and the present technique can be particularly effectively utilized. Alternatively, as in a display device 401 depicted in FIG. 7, the structure may be such that a light-transmitting area TA4 does not protrude to the inside of the display area but is close to a display area AA4 to be disposed in a non-display area NAA4. In the display device 401 as configured above, the light-transmitting area can be arranged without decreasing the area of the display area AA4 and the area of the non-display area NAA4 can be effectively utilized. The present technique is effective also in this structure.

(2) In the above-described embodiments, the liquid-crystal display device having the CF substrate including the color filter containing the colored layers has been exemplarily described. However, this is not meant to be restrictive. The present technique can be applied also to a display device including a liquid-crystal panel for monochrome display. Alternatively, the present technique can be applied also to a liquid-crystal panel including a touch sensor function.

(3) In the above-described embodiments, the liquid-crystal display device including the liquid-crystal panel in FFS (Fringe Field Switching) mode in which an electric field in a diagonal direction is applied to the liquid-crystal layer has been described. While the liquid-crystal panel in FFS mode is excellent in transmittance, view angle characteristics, display quality at the time of finger pressing, and so forth, the application of the present technique is not limited to this. The present technique can be applied also to a liquid-crystal panel operating in any of other modes, such as VA (Vertical Alignment) mode and TN (Twisted Nematic) mode in which an electric field is applied in a direction perpendicular to the substrate surface (longitudinal direction) and IPS (In-Plane-Switching) mode of a lateral electric field scheme.

(4) In the above-described embodiments, the liquid-crystal display device including a liquid-crystal panel having a liquid-crystal material as an electrooptical substance was exemplarily described, but is not limited to this. For example, the present technique can be applied also to a display device including an organic EL panel having an organic EL as an electrooptical substance.

The invention claimed is:

1. A display device comprising:
   a display panel capable of displaying an image; and
   imaging means that receives light from a target to be imaged as an image, wherein
   the display panel includes
      a first substrate,
      a second substrate arranged to be opposed to the first substrate, and
      an electrooptical substance layer containing an electrooptical substance and sealed between the first substrate and the second substrate,
   the display panel has a first substrate side as an external light entering side through which external light enters,
   the display panel is partitioned into a display area where an image is displayed and a non-display area where no image is displayed,
      the non-display area includes a light-transmitting area through which the external light entering the display panel is transmitted toward a second substrate side of the display panel, and
   the imaging means is disposed on the second substrate side of the display panel at a position such that the imaging means receives the external light transmitting through the light-transmitting area, and a short-wavelength-light absorption layer capable of absorbing light having a wavelength shorter than visible light is disposed on the external light entering side with respect to the electrooptical substance layer of the display panel and the short-wavelength-light absorption layer extends over an entire area of the light-transmitting area.

2. The display device according to claim 1, wherein the light-transmitting area is provided so that at least a part thereof protrudes to inside of the display area.

3. The display device according to claim 1, wherein
the electrooptical substance is a liquid-crystal material,
the first substrate includes an alignment layer that is contacted with the electrooptical substance layer to control alignment of the liquid-crystal material, and
the short-wavelength light absorption layer is disposed on the external light incidence side with respect to the alignment layer.

4. The display device according to claim 3, wherein the alignment layer is a photoisomerization alignment layer where photoisomerization is induced by light in a specific wavelength area, and a photoisomerization reaction wavelength area of the alignment layer is included in an absorption area of the short-wavelength light absorption layer.

5. The display device according to claim 1, wherein
the first substrate includes a transparent substrate,
the transparent substrate includes a colored layer on the electrooptical substance layer side thereof and visible light is transmitted through the colored layer and colored so that transmission light exhibits a predetermined color, and
the short-wavelength-light absorbing layer is disposed on the external light entering side with respect to the transparent substrate.

6. The display device according to claim 5, wherein
in the first substrate, a polarizing plate is disposed on the external light entering side with respect to the transparent substrate, and
an opening hole part is formed in the light-transmitting area in the polarizing plate, and the short-wavelength-light absorbing layer is disposed in the opening hole part.

7. The display device according to claim 5, wherein
in the first substrate, an external layer is disposed via an adhesion layer on the external light entering side with respect to the transparent substrate, and
the short-wavelength-light absorbing layer is formed of the adhesion layer containing a short-wavelength-light absorbent.

* * * * *